US009376943B2

(12) United States Patent
Fedotov

(10) Patent No.: US 9,376,943 B2
(45) Date of Patent: Jun. 28, 2016

(54) OIL SUMP AND AXLE CARRIER WITH AN OBLIQUE FLANGE FACE

(71) Applicant: MAN Truck & Bus AG, Munich (DE)

(72) Inventor: Sergiy Fedotov, Nürnberg (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/522,258

(22) Filed: Oct. 23, 2014

(65) Prior Publication Data

US 2015/0123392 A1 May 7, 2015

(30) Foreign Application Priority Data

Nov. 5, 2013 (DE) .......................... 10 2013 018 449

(51) Int. Cl.
*F01M 11/00* (2006.01)
*B62D 21/00* (2006.01)

(52) U.S. Cl.
CPC ........... *F01M 11/0004* (2013.01); *B62D 21/00* (2013.01); *F01M 2011/0054* (2013.01); *F01M 2011/0058* (2013.01)

(58) Field of Classification Search
CPC .................. F01M 11/0004; F01M 2011/0054; F01M 11/0058; B62D 21/00
See application file for complete search history.

(56) References Cited

U.S. PATENT DOCUMENTS

| 1,761,930 | A | * | 6/1930 | McCuen | 210/167.04 |
|---|---|---|---|---|---|
| 1,802,847 | A | * | 4/1931 | Stolte | 210/167.02 |
| 2,577,188 | A | * | 12/1951 | Hall | 184/106 |
| 3,189,126 | A | * | 6/1965 | May | 184/6.2 |
| 4,294,333 | A | * | 10/1981 | Little | 184/106 |
| 5,062,822 | A | * | 11/1991 | Nakayama et al. | 475/200 |
| 5,231,894 | A | * | 8/1993 | Okita et al. | 74/606 R |
| 6,167,980 | B1 | * | 1/2001 | Anderson et al. | 180/311 |
| 6,247,442 | B1 | * | 6/2001 | Bedard et al. | 123/198 E |
| 7,069,899 | B1 | * | 7/2006 | Okuda et al. | 123/195 C |
| 7,669,576 | B2 | * | 3/2010 | Muramatsu | 123/196 R |
| 7,748,500 | B2 | * | 7/2010 | Nagano et al. | 184/106 |
| 8,567,566 | B2 | * | 10/2013 | Nakashima et al. | 184/106 |
| 8,801,019 | B2 | * | 8/2014 | Fujimoto et al. | 280/163 |
| 8,821,104 | B2 | * | 9/2014 | Yasuda et al. | 414/685 |
| 2009/0020367 | A1 | * | 1/2009 | Kawashima | 184/106 |
| 2010/0181146 | A1 | | 7/2010 | Jessberger | |
| 2013/0218385 | A1 | * | 8/2013 | Wenger | B60L 1/003 701/22 |

FOREIGN PATENT DOCUMENTS

| DE | 102004017003 A1 | 10/2005 |
|---|---|---|
| EP | 1070834 A1 | 1/2001 |
| GB | 1422703 A | 1/1976 |

* cited by examiner

*Primary Examiner* — Laura Freedman
(74) *Attorney, Agent, or Firm* — Lucas & Mercanti, LLP

(57) ABSTRACT

An oil sump and an axle carrier of an internal combustion engine in a vehicle having obliquely inclined flange faces for fastening to one another. The flange faces being obliquely inclined relative to a longitudinal direction of the vehicle or a longitudinal direction of the vehicle.

19 Claims, 7 Drawing Sheets

OIL SUMP AND AXLE CARRIER WITH AN OBLIQUE FLANGE FACE

CROSS-REFERENCE TO RELATED APPLICATIONS

This application claims the priority of DE 10 2013 018 449.5 filed Nov. 5, 2013, which is incorporated herein by reference.

BACKGROUND OF THE INVENTION

The invention relates to an oil sump for an internal combustion engine, in particular for a diesel engine of a hauler or tractor. Furthermore, the invention relates to a correspondingly adapted axle carrier for the mechanical connection to the oil sump.

Conventional haulers often have a load-bearing oil sump 1, as shown in FIG. 8. On its upper side, the oil sump 1 is connected via a flange face 2 to an internal combustion engine 3, the latter as a rule being a diesel engine. In turn, the internal combustion engine 3 is connected via a flange face 4 to a flywheel housing 5. The flywheel housing 5 is then connected via a further flange face 6 to a transmission 7. On its front side, the oil sump 1 has a further flange face 8 which is connected via screws 9 to a correspondingly adapted flange face 10 of a front axle carrier 11. The front axle carrier 11 comprises firstly a seat 12 for a front axle and secondly a seat 13 for a steering cylinder, the seat 13 for the steering cylinder being arranged in front of the seat 12 for the front axle in the driving direction. This known construction for the load-bearing oil sump 1 has various disadvantages which will be explained briefly in the following text.

Firstly, the vertically oriented flange faces 8, 10 of the oil sump 1 and the front axle carrier 11 are relatively small, with the result that the flange faces 8, 10 can receive only relatively small screws 9 or too few screws 9.

Secondly, the flange faces 8, 10 protrude laterally from the oil sump 1 and from the front axle carrier 11, which leads to a lateral constriction, as a result of which the mechanical load-bearing capability of the flange connection is reduced further.

A further disadvantage of this known construction consists in that the seat 13 for the steering cylinder is arranged in front of the front axle. As a consequence, the steering cylinder is subjected during operation to abrasive wear, for example as a result of plant stubble of sunflowers striking it when the oil sump is arranged in a tractor. In this known construction, however, the seat 13 of the steering cylinder cannot be arranged in a protected manner behind the seat 12 for the front axle, since there is no space there.

BRIEF SUMMARY OF THE INVENTION

An object of the invention is to provide a correspondingly improved construction for the oil sump and the axle carrier.

The invention comprises the general technical teaching not to arrange the flange faces of the oil sump and axle carrier vertically, as in the conventional construction which was described at the outset, but rather in an obliquely inclined manner, the flange face of the oil sump preferably being situated on the underside of the oil sump, whereas the corresponding flange face of the axle carrier is preferably situated on the upper side of the axle carrier and is likewise inclined obliquely.

The oblique inclination of the flange faces of the oil sump and the axle carrier advantageously make a substantially greater area extent of the flange face possible, with the result that the screw connection between the oil sump and the axle carrier is possible by way of larger and/or more screws, since the larger flange areas afford sufficient space for this purpose.

Moreover, the oblique arrangement of the flange faces allow the steering cylinder to be arranged behind the front axle in the driving direction, as a result of which the steering cylinder is protected during operation, which leads to substantially lower wear on the steering cylinder.

A further advantage of the oblique inclination of the flange faces of the oil sump and the axle carrier consists in that the front axle can be moved closer to the rear axle, as a result of which the wheelbase is reduced, which in turn leads to improved manoeuvrability of the hauler.

In the oil sump according to the invention, the flange face for fastening to the axle carrier or another component is arranged at least partially on the underside of the oil sump and is inclined at least partially obliquely with respect to the vehicle longitudinal direction, that is to say with respect to the horizontal.

The oil sump according to the invention can be used both in an engine to be installed in a vehicle and in a stationary engine. The oil sump is preferably used in a commercial vehicle and/or tractor or hauler.

In one embodiment of the invention, the oil sump is substantially triangular in the longitudinal section along the vehicle longitudinal direction, one triangle side forming the obliquely inclined flange face, whereas another triangle side is preferably oriented horizontally and allows a mechanical connection to the internal combustion engine or the crankcase of the internal combustion engine.

In another embodiment of the invention, in contrast, the oil sump is substantially trapezoidal in the longitudinal section along the vehicle longitudinal direction.

A further embodiment of the invention provides, in contrast, that the oil sump has a substantially triangular section and a substantially rectangular section in the longitudinal section along the vehicle longitudinal direction, the two sections of the oil sump being arranged behind one another in the vehicle longitudinal direction. The triangular section of the oil sump is preferably situated in front of the rectangular section of the oil sump in the vehicle direction, the flange face of the oil sump for connection to the axle carrier being arranged on the underside of the triangular section.

In one preferred exemplary embodiment of the invention, the flange face of the oil sump has two fastening regions which lie next to one another with regard to the vehicle longitudinal direction and are spaced apart from one another. Here, the mechanical connection to the axle carrier preferably takes place only within the two fastening regions which lie laterally next to one another, the oil sump protruding downwards between the two fastening regions of the flange face of the oil sump, in particular in the form of a bulged protuberance of the oil sump in the vehicle centre.

It has already been mentioned in the above text that the flange face of the oil sump is inclined with respect to the vehicle longitudinal direction, that is to say with respect to the horizontal. The angle of inclination of the flange face of the oil sump relative to the horizontal or to the vehicle longitudinal direction preferably lies in the range from 5° to 80°, from 10° to 60°, from 15° to 50° or from 20° to 25°, mentioning only some examples for possible angles of inclination.

Furthermore, it is to be mentioned for the sake of completeness that the flange face of the oil sump is preferably inclined rearwards with respect to the vehicle longitudinal direction.

In order to achieve a flange face of the oil sump which is as large as possible, the flange face of the oil sump preferably extends in the vehicle longitudinal direction substantially over the entire length of the oil sump.

Furthermore, the flange face of the oil sump preferably extends from the upper side of the oil sump as far as the underside of the oil sump.

In one preferred exemplary embodiment of the invention, the flange face of the oil sump has a step in the vehicle longitudinal direction, it being possible for the step to be arranged centrally in the flange face with regard to the vehicle longitudinal direction. On its own or in conjunction with a corresponding step in the flange face of the axle carrier, this step in the flange face of the oil sump forms a clearance between the oil sump and the other component (for example, axle carrier), it being possible for this clearance to receive, for example, a liquid container, a run-on wedge, a ballast body or an electronic component.

The invention relates not only to above-described oil sump which is configured in an inventive manner, rather, the invention also relates to and includes a correspondingly adapted axle carrier which has an obliquely inclined flange face for connection to the oil sump.

In one preferred exemplary embodiment of the invention, the flange face of the axle carrier has two fastening regions which lie axially next to one another, to which end the axle carrier can be, for example, of U-shaped, V-shaped or annular configuration in plan view. A clearance then lies between the two fastening regions of the flange face of the axle carrier, into which clearance the oil sump can protrude downwards, in particular in the form of the bulged protuberance which has already been mentioned in the above text on the underside of the oil sump in the vehicle centre.

Furthermore, the angle of inclination of the flange face of the axle carrier is preferably adapted to the angle of inclination of the flange face of the oil sump. The angle of inclination of the flange face of the axle carrier therefore preferably lies in the range from 5° to 80°, from 10° to 60°, from 15° to 50° or from 20° to 25°, mentioning only some examples.

Furthermore, the flange face of the axle carrier is preferably inclined rearwards with respect to the vehicle longitudinal direction.

Furthermore, the flange face of the axle carrier is preferably substantially larger than the cross-sectional area of the axle carrier at a right angle with respect to the vehicle longitudinal direction on the front side of the oil sump, where the flange face of the axle carrier is normally situated. In one preferred exemplary embodiment of the invention, the size of the flange face is increased in this way by two times or more.

It has already been mentioned in the above text that the flange face of the oil sump can have a step, in order to form a clearance between the oil sump and the axle carrier. The flange face of the axle carrier also preferably has a corresponding step, the two steps in the flange face of the axle carrier on one side and in the flange face of the oil sump on the other side being arranged at the same point, in order together to form the clearance.

The axle carrier which is configured according to the invention preferably likewise has a seat for a steering cylinder which serves to mechanically drive a vehicle steering system. Moreover, the axle carrier according to the invention preferably also comprises a seat for a front axle, which is known per se from the prior art and therefore does not have to be described in greater detail.

In one variant of the invention, however, the seat for the steering cylinder is arranged behind the seat for the front axle in the vehicle longitudinal direction. This arrangement of the seat for the steering cylinder behind the front axle is advantageous because the steering cylinder is then subjected to low wear. The seat for the steering cylinder is therefore preferably arranged at least partially between the seat for the front axle and the oil sump with regard to the vehicle longitudinal direction.

There is also the possibility here that the steering cylinder is arranged at least partially under the oil sump in the mounted state. This is made possible by way of the oblique inclination of the flange face of the oil sump. As an alternative, there is the possibility that the steering cylinder runs at least partially in a clearance of the oil sump.

It has already been mentioned briefly in the above text that the construction according to the invention makes a reduction in the wheelbase and therefore an improvement in the manoeuvrability of the vehicle (for example, hauler) possible, by the front axle being moved rearwards closer to the internal combustion engine. For example, the seat which is arranged in the axle carrier for the front axle can reach at least partially as far as below the flange face of the axle carrier, in order to shorten the wheelbase. The spacing between the front axle and the front end of the flange face of the axle carrier is preferably relatively small, to be precise preferably smaller than 80 cm, 50 cm, 40 cm, 30 cm or even 20 cm. In this way, it can be achieved, for example, that the spacing between the front axle and the front end of the flange face of the axle carrier is smaller than 80%, 50%, 30% or even smaller than 20% of the length of the flange face of the axle carrier in the vehicle longitudinal direction.

The expression used in the context of the invention of an oblique inclination of the flange face of the oil sump or the axle carrier can have various meanings.

For example, the flange face of the oil sump or the axle carrier can be oriented at least partially not at a right angle with respect to the vehicle longitudinal direction, in particular with an oblique inclination with respect to the vehicle longitudinal direction.

Furthermore, the flange face of the oil sump or the axle carrier can at least partially not be parallel to a flange face between a flywheel housing and a transmission, in particular with an obtuse angle between the flange face of the oil sump or the axle carrier on one side and the flange face between the flywheel housing and the transmission on the other side.

Furthermore, the flange face of the oil sump or the axle carrier can at least partially not be parallel to a flange face between a flywheel housing and the internal combustion engine, in particular with an obtuse angle between the flange face of the oil sump or the axle carrier on one side and the flange face between the flywheel housing and the internal combustion engine on the other side.

Moreover, the flange face of the oil sump or the axle carrier can at least partially not be at a right angle with respect to a flange face between the oil sump and a crankcase of the internal combustion engine, in particular with an oblique inclination with respect to the flange face between the oil sump and the crankcase of the internal combustion engine.

Finally, the flange face of the oil sump or the axle carrier can at least partially not be at a right angle with respect to the crankshaft axis, in particular with an oblique inclination with respect to the crankshaft axis.

In conjunction with the specifications made in the description and the claims in relation to the vehicle longitudinal direction, these specifications can be related, in addition or as an alternative to the vehicle longitudinal direction, to the rotational axis of the crankshaft and/or to the flange face between the oil sump and the crankcase of the internal combustion engine. For example, the specifications with respect to the angle of inclination (a) can also be understood to be the angle between the flange face of the oil sump with respect to the other component, for example the axle carrier, and the axis of the crankshaft and/or also as an angle of the flange face between the oil sump and the crankcase of the internal combustion engine.

In addition to the above-described oil sump and the above-described axle carrier, the invention also claims protection for a motor vehicle (for example, tractor or hauler) having an oil sump of this type and a correspondingly adapted axle carrier which are connected mechanically to one another at their respective flange faces, in particular by way of a screw connection.

The motor vehicle according to the invention (for example, tractor or hauler) usually has an internal combustion engine (for example, diesel engine) with a crankcase and a crankshaft, a flywheel housing with a flywheel which is situated therein, and a transmission.

Furthermore, it is to be mentioned that the above-described axle carrier can be configured for mounting swing axles (for example, sprung or unsprung swing axles), independent wheel suspension systems, steering knuckle bearings or semi-mounted links, mentioning only some examples.

BRIEF DESCRIPTION OF THE DRAWINGS

Other advantageous developments of the invention are characterized in the subclaims or will be explained in greater detail in the following text together with the description of the preferred exemplary embodiments of the invention using the figures, in which:

DETAILED DESCRIPTION OF THE PREFERRED EMBODIMENTS

Figure 8:
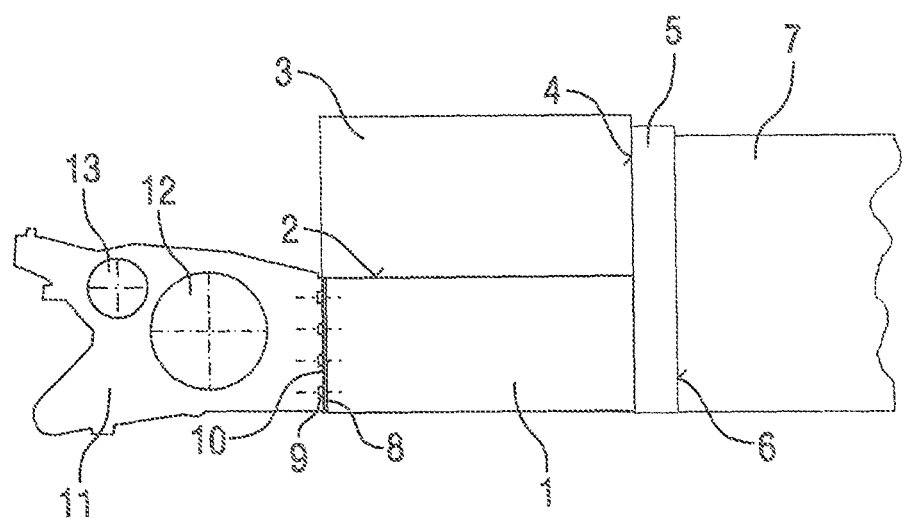
FIG. 8 shows a diagrammatic side view of a conventional construction, as described at the outset.

FIGS. 1A-1D show a construction according to the invention which coincides largely with the construction which was described at the outset and is shown in FIG. 8, with the result that reference is made to the above description in order to avoid repetitions, the same reference numerals being used for corresponding details.

Figure 1A:
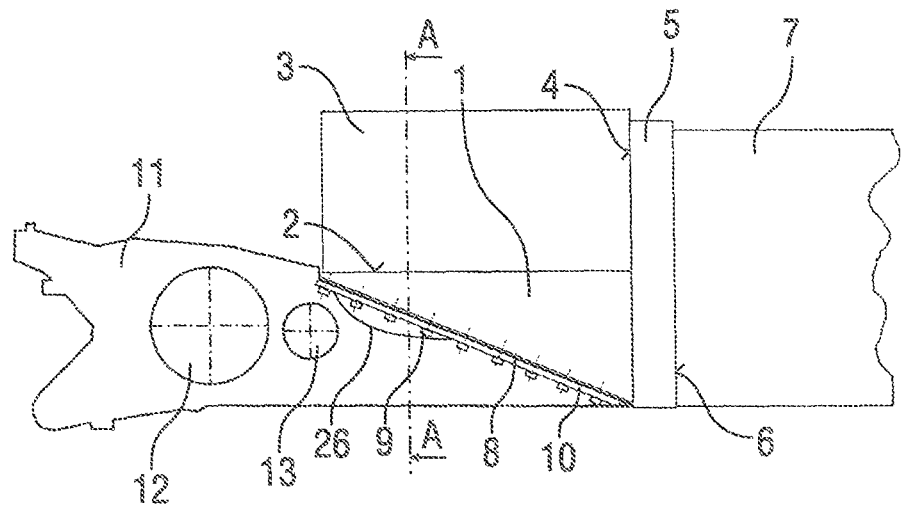
FIG. 1A shows a diagrammatic side view of a construction according to the invention with obliquely inclined flange faces of an oil sump and a front axle carrier.
Figure 1B:
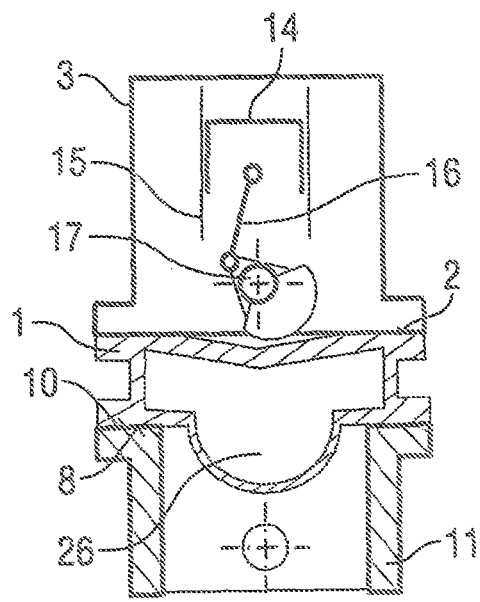
FIG. 1B shows a cross-sectional view through the construction according to FIG. 1A along the sectional line A-A.
Figure 1C:
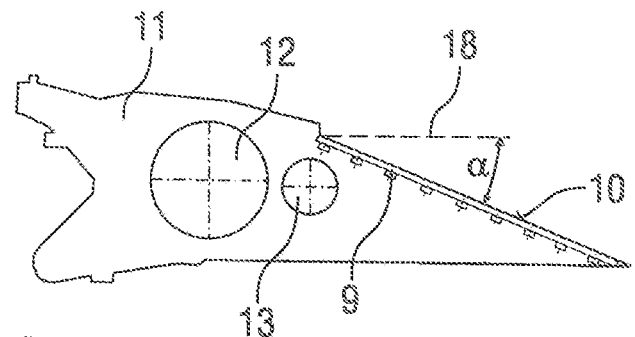
FIG. 1C shows a side view of the front axle carrier according to FIG. 1A on its own.
Figure 1D:
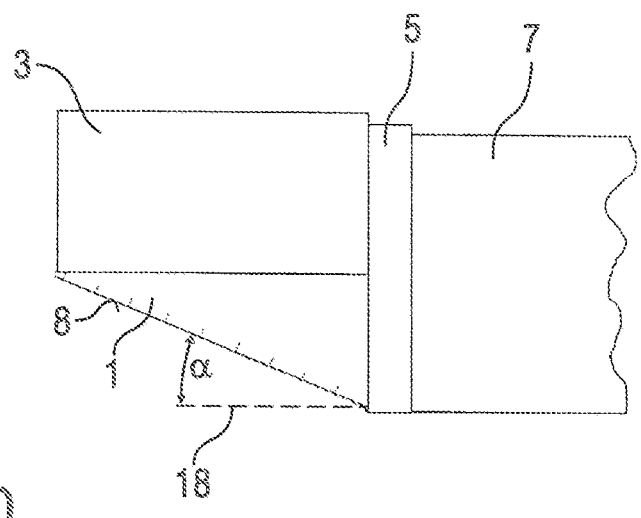
FIG. 1D shows a side view of the internal combustion engine, the oil sump, the flywheel housing and the transmission of the construction according to FIG. 1A without the front axle carrier.

FIG. 1B additionally shows that the internal combustion engine 3 has a piston 14, a cylinder 15, a connecting rod 16 and a crankshaft 17, which is known per se from the prior art and therefore does not have to be described in greater detail.

One special feature of the construction according to the invention consists in that the flange face 8 of the oil sump 1 and also the flange face 10 of the front axle carrier 11 are inclined rearwards by an angle of inclination α with respect to the vehicle longitudinal direction 18. The angle of inclination α can be, for example, α≈21°, but other values for the angle of inclination α are also possible. This inclination of the flange faces 8, 10 advantageously makes a substantially larger area of the flange faces 8, 10 possible and therefore the use of larger screws 9 or a larger number of screws 9 compared to the prior art of FIG. 8.

A further difference of the construction according to the invention in comparison with the conventional construction consists in that the seat 13 for the steering cylinder is arranged behind the seat 12 for the front axle in the vehicle longitudinal direction. This is advantageous because the steering cylinder is then protected behind the front axle and is subjected only to relatively low wear during operation. This advantageous arrangement of the seat 13 for the steering cylinder is possible, by the seat 13 for the steering cylinder being arranged at least partially under the flange face 10 of the front axle carrier 11.

Figure 2:
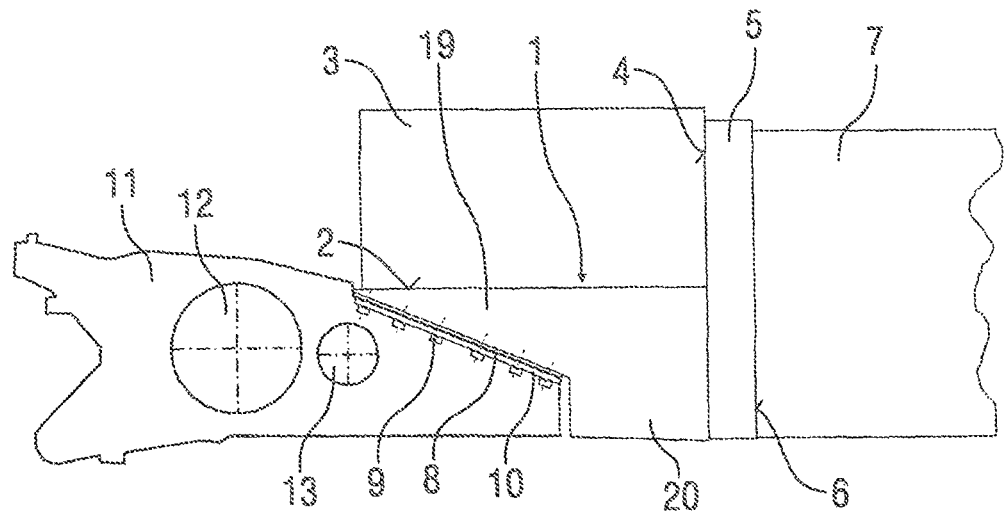
FIG. 2 shows a modification of the construction according to FIGS. 1A-1D with an oil sump with a triangular section and a rectangular section.

The exemplary embodiment according to FIG. 2 coincides partially with the above-described exemplary embodiment, with the result that reference is made to the above description in order to avoid repetitions, the same reference numerals being used for corresponding details.

One special feature of this exemplary embodiment consists in that a vertical cross-section of the oil sump 1 has a front triangular section 19 and a rear rectangular section 20 along the vehicle longitudinal direction.

Figure 3:
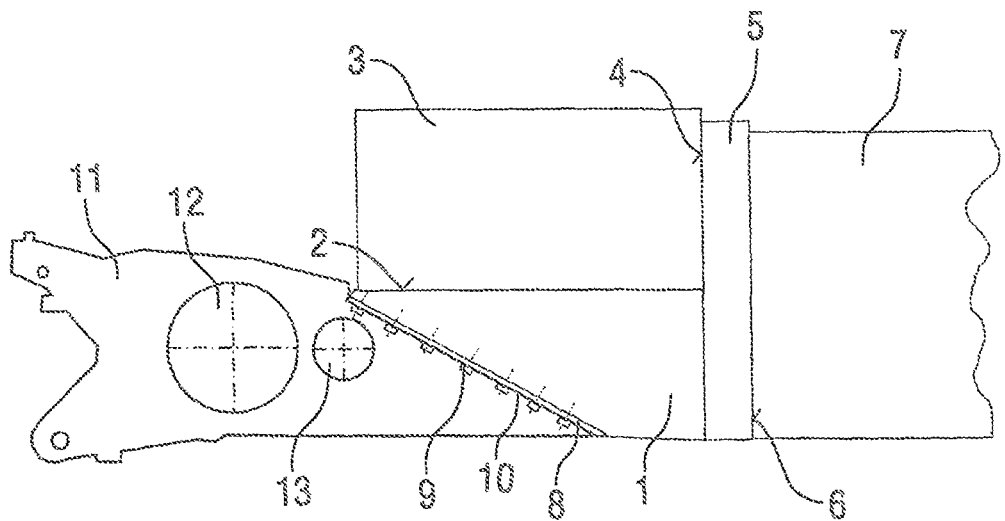
FIG. 3 shows a side view of a modification of the exemplary embodiment according to FIGS. 1A-1D with an oil sump which is trapezoidal in the longitudinal section.

The exemplary embodiment according to FIG. 3 also coincides partially with the exemplary embodiment which was described at the outset, with the result that reference is made to the above description in order to avoid repetitions, the same reference numerals being used for corresponding details.

One special feature of this exemplary embodiment consists in that a vertical longitudinal cross-section of the oil sump 1 is trapezoidal along the vehicle longitudinal direction 18.

Figure 4A:
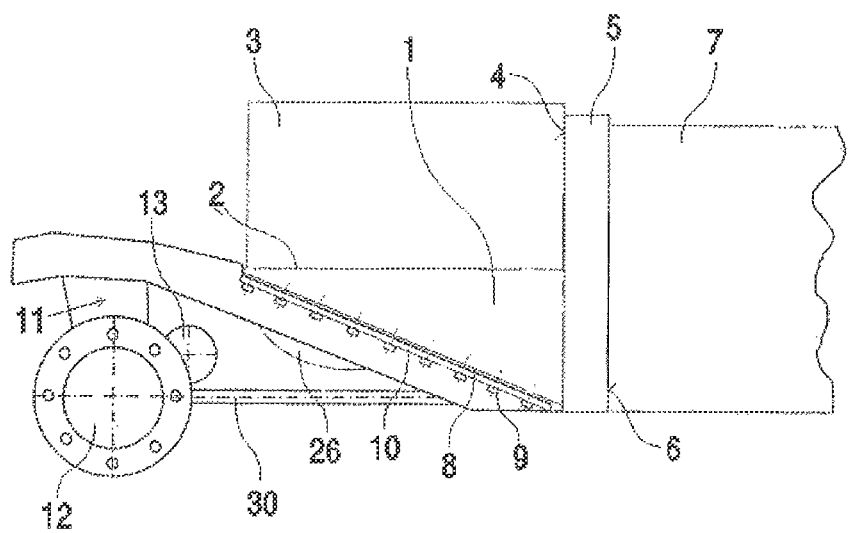
FIG. 4A shows a side view of a modification of the exemplary embodiment according to FIGS. 1A-1D.
Figure 4B:
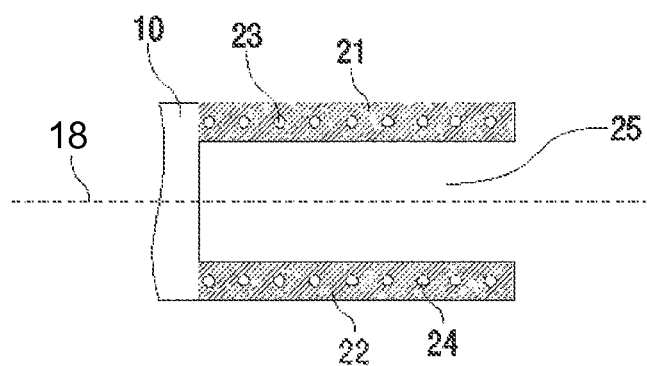
FIG. 4B shows a diagrammatic plan view of the flange face of the axle carrier in the exemplary embodiment according to FIG. 4A.

The exemplary embodiment according to FIGS. 4A and 4B also coincides largely with the above-described exemplary embodiments, the same reference numerals being used for corresponding details.

It can be seen in the plan view according to FIG. 4B that the flange face 10 of the front axle carrier 11 has two fastening regions 21, 22 which are shown hatched in the drawing. The two fastening regions 21, 22 are arranged next to one another with regard to the vehicle longitudinal direction 18 and in each case comprise numerous holes 23, 24 for receiving the screws 9.

The front axle carrier 11 has a clearance 25 between the two lateral fastening regions 21, 22 which are arranged next to one another, which clearance 25 makes it possible that a bulged protuberance 26 protrudes downwards into the clearance 25 beyond the flange face 10 on the underside of the oil sump 1.

Figure 5:
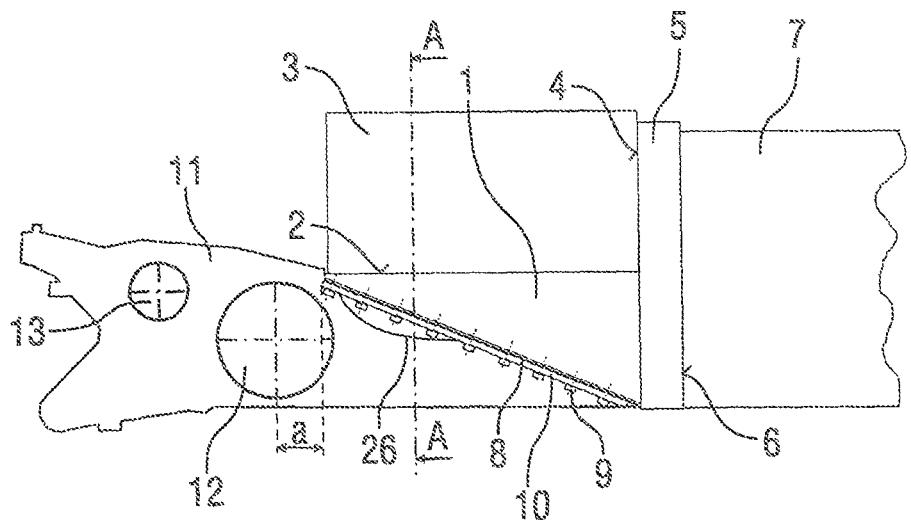

The exemplary embodiment according to FIG. 5 also coincides partially with the exemplary embodiment which was described at the outset, with the result that reference is made to the above description in order to avoid repetitions, the same reference numerals being used for corresponding details.

One special feature of this exemplary embodiment consists in that the seat 13 for the steering cylinder is arranged in front of the seat 12 for the front axle, as in the prior art according to FIG. 8. The inclination according to the invention of the flange faces 8, 10 of the oil sump 1 and the front axle carrier 11 makes it possible, however, to move the front axle rearwards closer to the internal combustion engine 3, as a result of which the wheelbase of the hauler is reduced and the manoeuvrability is improved. Here, the front axle is thus situated at a relatively small spacing a from the front end of the flange faces 8, 10.

Figure 6:
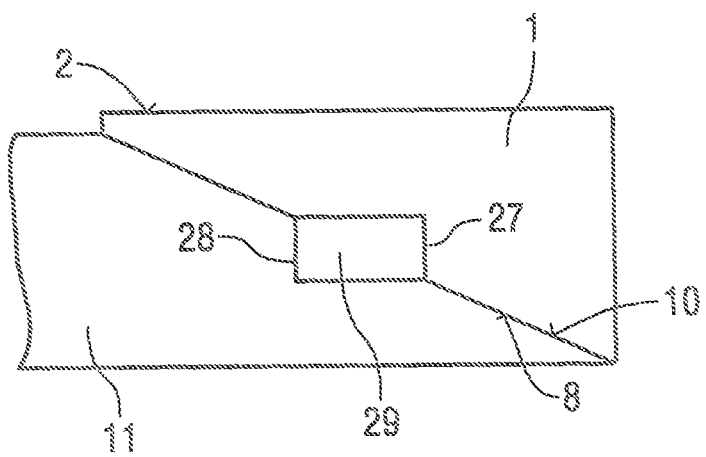
FIG. 6 shows a diagrammatic illustration with steps in the flange faces of the oil sump and the front axle carrier.

FIG. 6 shows a greatly simplified diagrammatic illustration of a development according to the invention, with the result that reference is made to the above description in order to avoid repetitions, the same reference numerals being used for corresponding details.

One special feature of this exemplary embodiment consists in that in each case one step 27 and 28, respectively, is arranged in the flange face 10 of the front axle carrier 11 and also in the flange face 8 of the oil sump 1, as a result of which a clearance 29 is formed between the two flange faces 8, 10. For example, a modular steering cylinder, a liquid container, a run-on wedge, a ballast body or an electronic component can be arranged in the clearance 29.

Figure 7A:
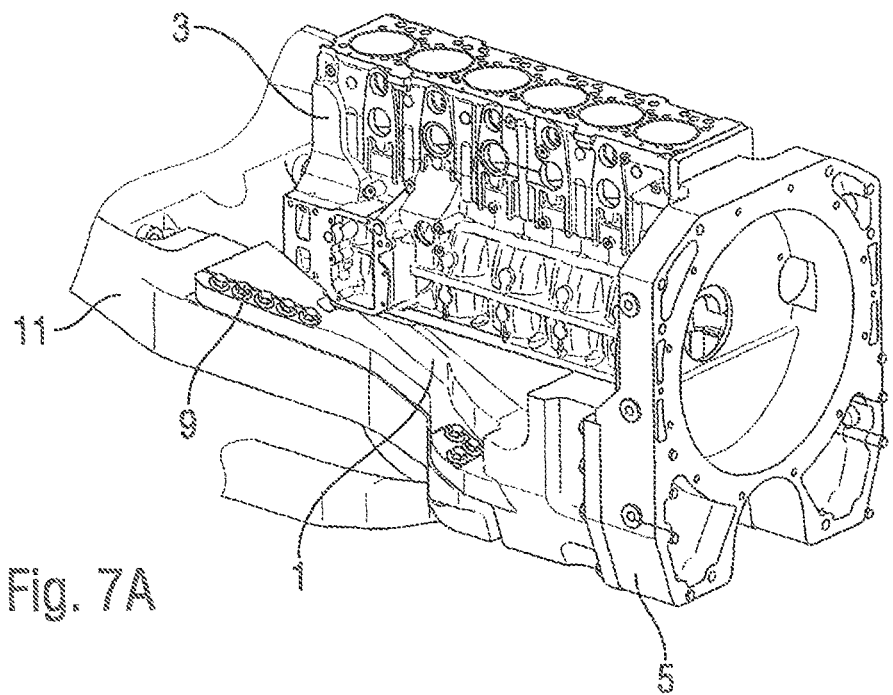
FIG. 7A shows a perspective view of a construction according to the invention.
Figure 7B:
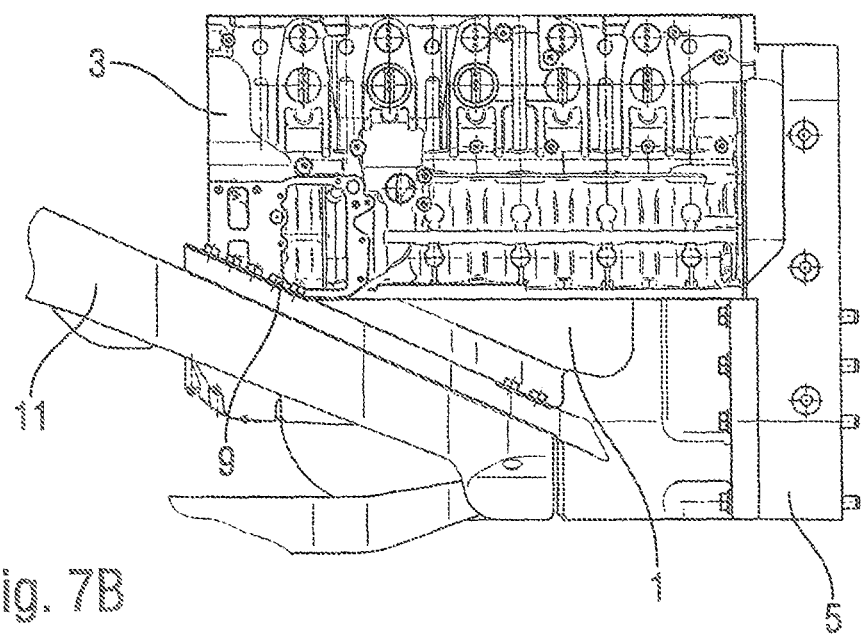
FIG. 7B shows a side view of the construction from FIG. 7A.

Finally, FIGS. 7A and 7B show a perspective view and a side view, respectively, of a construction according to the invention with inclined flange faces between the oil sump and the front axle carrier.

The invention is not restricted to the above-described preferred exemplary embodiments. Rather, a multiplicity of variants and modifications are possible which likewise make use of the concept of the invention and therefore fall within the scope of protection. In particular, the invention also claims protection for the subject matter and the features of the sub-claims independently of the claims which are referred to.

LIST OF REFERENCE NUMERALS

1 Oil sump
2 Flange face between the oil sump and the internal combustion engine
3 Internal combustion engine
4 Flange face between the internal combustion engine and the flywheel housing
5 Flywheel housing
6 Flange face between the flywheel housing and the transmission
7 Transmission
8 Flange face of the oil sump
9 Screws
10 Flange face of the front axle carrier
11 Front axle carrier
12 Seat for the front axle
13 Seat for the steering cylinder
14 Piston
15 Cylinder
16 Connecting rod
17 Crankshaft
18 Vehicle longitudinal direction
19 Front triangular section of the oil sump
20 Rear rectangular section of the oil sump
21 Left-hand fastening region of the flange face
22 Right-hand fastening region of the flange face
23 Holes in the left-hand fastening region of the front axle carrier
24 Holes in the right-hand fastening region of the front axle carrier
25 Clearance between the left-hand and right-hand fastening region of the flange face
26 Bulging protuberance of the oil sump
27 Step in the flange face of the oil sump
28 Step in the flange face of the axle carrier
29 Clearance between the oil sump and the axle carrier
30 Drive shaft
α Angle of inclination of the flange faces of the oil sump and the axle carrier
a Spacing between the front axle and the front end of the flange face of the axle carrier

The invention claimed is:

1. An oil sump for an internal combustion engine of a vehicle, comprising a first flange face for a first mechanical connection of the oil sump to a corresponding flange face of a front axle carrier of the vehicle and a second flange face for a second mechanical connection of the oil sump to the internal combustion engine, wherein the first flange face of the oil sump is inclined obliquely at least partially relative to a horizontal direction of the vehicle.

2. The oil sump according to claim 1, wherein at least one of
the first flange face of the oil sump is at least partially not at a right angle with respect to a vehicle longitudinal direction,
the first flange face of the oil sump is at least partially not parallel to a flange face between a flywheel housing and a transmission of the vehicle,
the first flange face of the oil sump is at least partially not parallel to a flange face between the flywheel housing and the internal combustion engine,
the first flange face of the oil sump is at least partially not at a right angle with respect to the second flange face, and
the first flange face of the oil sump is at least partially not at a right angle with respect to an axis of a crankshaft of the internal combustion engine.

3. The oil sump according to claim 1, wherein at least one of
the first flange face of the oil sump is at least partially with an oblique inclination with respect to a vehicle longitudinal direction,
the first flange face of the oil sump is at least partially with an obtuse angle with respect to a flange face between a flywheel housing and a transmission of the vehicle,
the first flange face of the oil sump is at least partially with an obtuse angle with respect to a flange face between the flywheel housing and the internal combustion engine,
the first flange face of the oil sump is at least partially with an oblique inclination with respect to the second flange face, and
the first flange face of the oil sump is at least partially with an oblique inclination with respect to an axis of a crankshaft of the internal combustion engine.

4. The oil sump according to claim 1, wherein a vertical longitudinal cross-section of the oil sump is one of:
substantially triangular in the longitudinal section along a vehicle longitudinal direction, or
substantially trapezoidal in the longitudinal section along the vehicle longitudinal direction.

5. The oil sump according to claim 1, wherein a vertical longitudinal cross-section of the oil sump has a substantially triangular section and a substantially rectangular section in a longitudinal section along a vehicle longitudinal direction, the substantially triangular section and the substantially rectangular section of the oil sump being arranged one behind another in the vehicle longitudinal direction, and
the first flange face of the oil sump is arranged on an underside of the substantially triangular section.

6. The oil sump according to claim 1, wherein
the first flange face of the oil sump has two fastening regions,
the two fastening regions of the first flange face of the oil sump are arranged laterally next to one another with regard to a vehicle longitudinal direction and are spaced apart from one another, and
the oil sump includes a portion protruding downwards between the two fastening regions of the first flange face of the oil sump.

7. The oil sump according to claim 1, wherein at least one of:
the first flange face of the oil sump is inclined with respect to a vehicle longitudinal direction by an angle of inclination ($\alpha$) of more than 5° and less than 80°,
the first flange face of the oil sump is inclined rearwards with respect to the vehicle longitudinal direction,
the first flange face of the oil sump extends in the vehicle longitudinal direction substantially over the entire length of the oil sump, and
the first flange face of the oil sump extends from an upper side of the oil sump as far as an underside of the oil sump.

8. The oil sump of claim 1, wherein
the first flange face of the oil sump has a step along a vehicle longitudinal direction, and
the step forms a clearance between the oil sump and the axle carrier, for receiving
a steering cylinder,
a liquid container,
a run-on wedge,
a ballast body, or
an electronic component.

9. An axle carrier for a vehicle having a flange face for a mechanical connection of the axle carrier to a corresponding flange face of an oil sump of an internal combustion engine of the vehicle, wherein the flange face of the axle carrier is inclined obliquely at least partially relative to a horizontal direction, the axle carrier being separate from the internal combustion engine.

10. The axle carrier according to claim 9, wherein at least one of
the flange face of the axle carrier is at least partially not at a right angle with respect to a vehicle longitudinal direction,
the flange face of the axle carrier is at least partially not parallel to a flange face between a flywheel housing and a transmission of the vehicle,
the flange face of the axle carrier is at least partially not parallel to a flange face between the flywheel housing and the internal combustion engine,
the flange face of the axle carrier is at least partially not at a right angle with respect to a flange face between the oil sump and a crankcase of the internal combustion engine, and
the flange face of the axle carrier is at least partially not at a right angle with respect to an axis of a crankshaft of the internal combustion engine.

11. The axle carrier according to claim 9, wherein at least one of:
the flange face of the axle carrier is at least partially with an oblique inclination with respect to a vehicle longitudinal direction,
the flange face of the axle carrier is at least partially with an obtuse angle with respect to a flange face between a flywheel housing and a transmission of the vehicle,
the flange face of the axle carrier is at least partially with an obtuse angle with respect to a flange face between the flywheel housing and the internal combustion engine,
the flange face of the axle carrier is at least partially with an oblique inclination with respect to a flange face between the oil sump and a crankcase of the internal combustion engine, and
the flange face of the axle carrier is at least partially with an oblique inclination with respect to an axis of a crankshaft of the internal combustion engine.

12. The axle carrier of claim 9, wherein
the flange face of the axle carrier has two fastening regions which lie next to one another, the axle carrier being one of U-shaped, V-shaped or annularly closed in plan view, being corrugated or being connected to crossmembers, and
a clearance lies between the fastening regions of the flange face of the axle carrier for receiving a portion of the oil sump that protrudes downwards into the clearance.

13. The axle carrier according to claim 9, wherein at least one of:
the flange face of the axle carrier is inclined by an angle of inclination ($\alpha$) of more than 5° and less than 80°,
the flange face of the axle carrier is inclined rearwards with respect to a vehicle longitudinal direction, and
the flange face of the axle carrier is substantially larger than a cross-sectional area of the axle carrier at a right angle with respect to the vehicle longitudinal direction on a front side of the oil sump.

14. The axle carrier according to claim 9, wherein the flange face of the axle carrier has a step in a vehicle longitudinal direction, and
the step forms a clearance between the oil sump and the axle carrier for receiving one of
a steering cylinder,
a liquid container,
a run-on wedge,
a ballast body, or
an electronic component.

15. The axle carrier according to claim 9, further comprising:
a seat for a steering cylinder for mechanically driving a vehicle steering system, and
a seat for a front axle.

16. The axle carrier according to claim 15, wherein at least one of:
the seat for the steering cylinder is arranged behind the seat for the front axle in a vehicle longitudinal direction,
the seat for the steering cylinder is arranged at least partially between the seat for the front axle and the oil sump in the vehicle longitudinal direction,
the steering cylinder is arranged at least partially under the oil sump, and
the steering cylinder runs at least partially in a clearance of the oil sump.

17. The axle carrier according to claim 9, wherein the axle carrier has a seat for a front axle, and one of:
the seat for the front axle is situated partially below the flange face of the axle carrier to achieve a short wheelbase, or
the front axle is arranged at a small spacing (a) from a front end of the flange face of the axle carrier in order to achieve a short wheelbase, the spacing (a) in the vehicle longitudinal direction being smaller than one of 80 cm or 80% of the length of the flange face of the axle carrier in a vehicle longitudinal direction.

18. The axle carrier according to claim 17, wherein the spacing (a) in the vehicle longitudinal direction is smaller than one of 20 cm or 20% of the length of the flange face of the axle carrier in the vehicle longitudinal direction.

19. A motor vehicle, comprising:
an oil sump of an internal combustion engine of the vehicle, and
a front axle carrier,
the oil sump having a first flange face for a first mechanical connection of the oil sump to a corresponding flange face of the front axle carrier of the vehicle and a second flange face for a second mechanical connection of the oil sump to the internal combustion engine, wherein the first flange face of the oil sump is inclined obliquely at least partially relative to a horizontal direction, the flange face of the axle carrier being connected mechanically to the first flange face of the oil sump by a threaded fastener connection.

* * * * *